United States Patent
Park et al.

(10) Patent No.: US 8,732,842 B2
(45) Date of Patent: May 20, 2014

(54) METHOD AND APPARATUS FOR MANAGING CONTENTS IN MOBILE DEVICE

(75) Inventors: Young Min Park, Gyeonggi-do (KR); Kwang Hyun Yoo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 458 days.

(21) Appl. No.: 12/607,232

(22) Filed: Oct. 28, 2009

(65) Prior Publication Data

US 2010/0107258 A1  Apr. 29, 2010

(30) Foreign Application Priority Data

Oct. 29, 2008  (KR) .................... 10-2008-0106326

(51) Int. Cl.
*G06F 21/24* (2006.01)
*G06F 3/048* (2013.01)
*G06F 15/16* (2006.01)

(52) U.S. Cl.
USPC ............................... 726/26; 713/182; 705/51

(58) Field of Classification Search
USPC .................... 726/26; 715/810, 716; 709/219; 713/182; 705/51
See application file for complete search history.

(56) References Cited

U.S. PATENT DOCUMENTS

| | | | |
|---|---|---|---|
| 2004/0230806 A1* | 11/2004 | Lisanke ..................... 713/182 |
| 2005/0021995 A1* | 1/2005 | Lal et al. ..................... 713/200 |
| 2005/0091508 A1* | 4/2005 | Lee et al. ..................... 713/182 |
| 2005/0278716 A1* | 12/2005 | Koppen et al. ............. 717/168 |
| 2006/0059102 A1* | 3/2006 | Ebihara et al. .............. 705/59 |
| 2006/0242073 A1* | 10/2006 | Padawer et al. ............. 705/51 |
| 2006/0259770 A1* | 11/2006 | Peinado ...................... 713/171 |
| 2007/0100755 A1* | 5/2007 | Kragt et al. ................. 705/51 |
| 2008/0109911 A1* | 5/2008 | Tedesco et al. ............. 726/30 |

* cited by examiner

*Primary Examiner* — Brandon Hoffman
*Assistant Examiner* — Samuel Ambaye
(74) *Attorney, Agent, or Firm* — Cha & Reiter, LLC

(57) ABSTRACT

A method and an apparatus which permits intuitive management of a variety of digital contents stored in a mobile device. In a method for managing the contents, the mobile device determines a type of the content when a play of the content is ended. If the content is digital rights management (DRM) content, the mobile device checks a license count for authorized access to the DRM content and then determines whether or the license has expired or will expire shortly. If the license has expired, the mobile device removes the license-expired DRM content, or alternatively transfers the license-expired DRM content to a specified folder.

26 Claims, 8 Drawing Sheets

METHOD AND APPARATUS FOR MANAGING CONTENTS IN MOBILE DEVICE

This application claims priority from an application entitled "METHOD AND APPARATUS FOR MANAGING CONTENTS IN MOBILE DEVICE" filed in the Korean Intellectual Property Office on Oct. 29, 2008 and assigned Serial No. 10-2008-0106326, the contents of which are incorporated herein by reference in its entirety.

BACKGROUND OF THE INVENTION

1. Field of the Invention

The present invention relates to contents management technology. More particularly, the present invention relates to a method and an apparatus for efficiently managing digital contents to which a digital rights management (DRM) is applied.

2. Description of the Related Art

To protect paid contents being used in mobile devices from illegal copy or unauthorized redistribution, a digital rights management (DRM) technology has been proposed. To impose limitations on the usage of contents and thereby to effectively guarantee the right of copyright holders, the DRM applies an encryption technique to a variety of digital contents such as documents, music files, sound files, video files, e-books, and games. In general, the DRM provides a protective and administrable system for the whole process of creating, publishing, distributing, and consuming digital contents.

The contents to which DRM technology is applied (hereinafter referred to as 'DRM contents') always remain encrypted, thus allowing only authorized users the ability to access, decode and consume the encrypted contents. If such DRM content is illegally copied, unauthorized users who have no permission by a license typically fail to decrypt the encrypted content and are denied access. Therefore, the DRM technology can be useful to prevent illegal copying.

In operation, in DRM a license is created in a DRM server and then sold to a user who wishes to use/access the digital contents. Such a license to use contents is stored separately from digital contents in a user's device or player (hereinafter named generically 'a mobile device'), thus permitting or restricting the usage of contents. Typically, a license may employ one or more numerous techniques to ensure that only the authorized user gains access to the content, for the amount of access agreed to, such as a count technique, an interval technique, a timed-count technique, an accumulation technique, and so forth.

A license contains information about limitations on the usage of DRM contents. For example, if a user purchases a certain MP3 music file with an exhaustible license that is available for ten plays, he or she can use the purchased music file just ten times. In this particular case, whenever that music file is played, the authorized count is reduced by one. If the count becomes finally zero by the tenth time the music is played (i.e., if a license expires), the music file cannot be accessed any longer. So a user who wants more use of the music file must renew their license, or obtain a license for a longer or shorter number of replays, as desired.

On the other hand, when receiving a request for playing a certain license-expired content, a conventional mobile device may display only a message that a play is not permissible, or may automatically jump to the next content.

In addition, a conventional mobile device may have in some non-DRM contents other than or in addition to DRM contents. Therefore, it may not be easy for a user to distinguish certain non-usable contents from usable contents in a content list which contains both DRM contents and non-DRM contents. This problem may become more critical as the quantity of content increases. Furthermore, it may be difficult to distinguish license-expired, non-usable DRM contents from usable DRM contents among DRM contents arranged in a content list. That is, there is no way of distinguishing DRM contents from a variety of contents, or distinguishing license-expired DRM contents from DRM contents. Accordingly, there often arises a user's inconvenience in managing contents as it may not be possible to ascertain the status of some of the contents.

Additionally, when licenses of certain DRM contents have expired, a user may repurchase some of licenses but may remove other contents instead. In this case, a user has to rely completely on his or her memory to remember whether to repurchase or remove each license of individual DRM contents. So, this inability to distinguish status also causes a user's inconvenience in managing contents.

Accordingly, there is a need in the art to allow an efficient management for different types of contents including DRM contents and normal contents.

BRIEF SUMMARY OF THE INVENTION

An exemplary aspect of the present invention is to provide a method and an apparatus which may allow a user to manage intuitively and simply a variety of contents stored in a mobile device.

Another exemplary aspect of the present invention is to provide a user interface which may offer an intuitively graphical display for many contents and their list in a mobile device.

Still another exemplary aspect of the present invention is to provide a method and an apparatus which may allow for separating, saving and searching license-expired contents among DRM contents and also for conveniently removing or transferring the separated contents.

Yet another exemplary aspect of the present invention is to provide a method and an apparatus which may allow for simpler management and search of contents through an intuitive user interface that offers classification of DRM contents and non-DRM contents existing together in a mobile device.

According to an aspect of the present invention, provided is a method for managing contents in a mobile device, the method comprising: determining a type of content when a play of the content is ended; if the content is DRM (digital rights management) content, counting a license of the DRM content; determining whether the license expires; and if the license expires, removing the license-expired DRM content or alternatively transferring the license-expired DRM content to a specified folder.

According to another exemplary aspect of the present invention, a method for displaying a content list in a mobile device includes: in response to a request for a content list of a specified category, determining a display format of the requested content list; and displaying the requested content list in the determined display format selected from all contents display, DRM contents display, usable DRM contents display and license-expired DRM contents display.

According to still another exemplary aspect of the present invention, provided is a mobile device comprising: an input unit configured to create input signals for selecting at least one of contents in a content list, for canceling a selection of a specific content, and for transferring or removing the selected content; a display unit configured to display the content list, depending on a display format selected respectively corresponding to normal contents, DRM contents, usable DRM contents, license-expired DRM contents, and all contents; a memory unit configured to separately store the normal contents, the DRM contents, the usable DRM contents, and the license-expired DRM contents; and a control unit configured to control a display of a menu screen for the content list, a display of status information about the DRM contents, a display of license purchase information about the DRM contents, a classification of contents according to the display format, and a display of the content list by types of the contents.

Other exemplary aspects, advantages, and salient features of the invention will become apparent to those skilled in the art from the following detailed description, which, taken in conjunction with the annexed drawings, discloses exemplary embodiments of the invention.

DETAILED DESCRIPTION

Exemplary, non-limiting exemplary embodiments of the present invention will now be described more fully with reference to the accompanying drawings. This invention may, however, be embodied in many different forms other than those forms shown and described herein and the invention should not be construed as being limited to the exemplary embodiments set forth herein. Rather, the disclosed embodiments are provided so that this disclosure will be thorough so as to convey an understanding of the invention to those skilled in the art. The principles and features of this invention may be employed in varied and numerous exemplary embodiments without departing from the spirit of the invention or the scope of the appended claims.

Furthermore, well-known or widely used techniques, elements, structures, and processes may not be described or illustrated in detail to avoid obscuring appreciation of the present invention by a person of ordinary skill in the art with unnecessary detail. Although the drawings represent exemplary embodiments of the invention, the drawings are not necessarily to scale and certain features may be exaggerated or omitted in order to better emphasize and explain certain aspects of the present invention.

The present invention relates to a method and an apparatus for managing contents in a mobile device. According to the present invention, a user interface permits a user to manage intuitively and simply the contents to which DRM technology is applied, and further provided are managing method and apparatus employing the user interface.

In the exemplary embodiments of the present invention, a number of contents stored in the mobile device may be classified into non-DRM contents to which DRM technology is not applied, and DRM contents to which DRM technology is applied. Furthermore, the DRM contents may be classified into usable DRM contents and non-usable DRM contents with the expiration of a license to access DRM contents.

According to exemplary embodiments of the present invention, provided is a function to separately search DRM contents and normal contents among a variety of contents in the mobile device. Also provided is information which allows a user to distinguish DRM content from normal (non-DRM) contents in a content list which contains DRM contents and normal contents together. Further provided is a function to separately search license-expired, non-usable DRM contents from usable DRM contents among the DRM contents.

Additionally, some exemplary embodiments of the present invention provide a function to remove non-usable DRM contents with the expiration of a license or to transfer them to a specified folder. Besides, provided is a function to simply repurchase license-expired DRM contents.

Hereinafter, a process of acquiring DRM content and its license using a mobile device in accordance with an exemplary embodiment of the present invention will be described with reference to FIG. 1.

Figure 1:
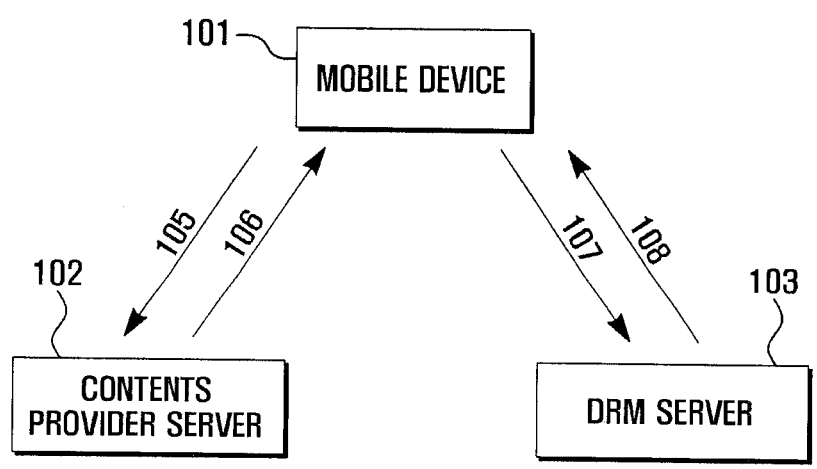
FIG. 1 is a schematic view illustrating a system configuration associated with the purchase of DRM content and the acquisition of a license in accordance with an exemplary embodiment of the present invention.

FIG. 1 is a schematic view that illustrates a system configuration associated with the purchase of DRM content and the acquisition of a license in accordance with an exemplary embodiment of the present invention.

Referring now to FIG. 1, when a user wants to buy certain content, a mobile device 101 communicates with a content provider server 102 which will provide the content desired by a user. Then the mobile device 101 transmits a message for requesting the purchase of the desired content to the content provider server 102 (step 105). Here, the content provider server 102 may be often one of website servers.

Next, the content provider server 102 sends the requested content to the mobile device 101 (step 106). Here, let's suppose the requested content is one of DRM contents to which DRM technology is applied. In general, the meaning of applying DRM to certain contents includes encrypting the contents by using both a predefined encryption key and a predefined encryption format, and also includes recording a usage rule (e.g., usable count, usable time, etc.) with regard to the usage of the contents according to a prescribed format.

On receipt of the DRM content from the content provider server 102, the mobile device 101 transmits a message requesting a license to a DRM server to access the received content (step 107). The DRM server 103 may be often a server for managing licenses of individual DRM contents. Here, a license is permission to vest the authority to use a specific content, including a usage rule and a decoding key required to decode the encrypted content. The mobile device 101 can play DRM contents on the condition of receiving their licenses as prescribed by the DRM system.

Next, the DRM server 103 certifies whether or not a user of the mobile device 101 is authorized for the content, creates a license for the DRM content if he or she is an authorized user, and transmits the created license to the mobile device 101 (step 108). Here, the license may include both a usage rule and a decoding key for the content.

Next, using the license received from the DRM server 103, the mobile device 101 is now able to execute a play of the content received from the contents provider server 102.

Specifically, the mobile device 101 extracts a decoding key and a usage rule from the license in order to decode the content. Then, the mobile device 101 examines the extracted usage rule to check usable count and/or usable time. If a current use of the content does not violate the usage rule, the mobile device 101 decodes the content by using a decoding key and then plays the decoded content.

The DRM contents acquired as discussed above are distinguished from normal (non-DRM) contents as will be described hereinafter with reference to FIGS. 2 and 3.

Figure 2:
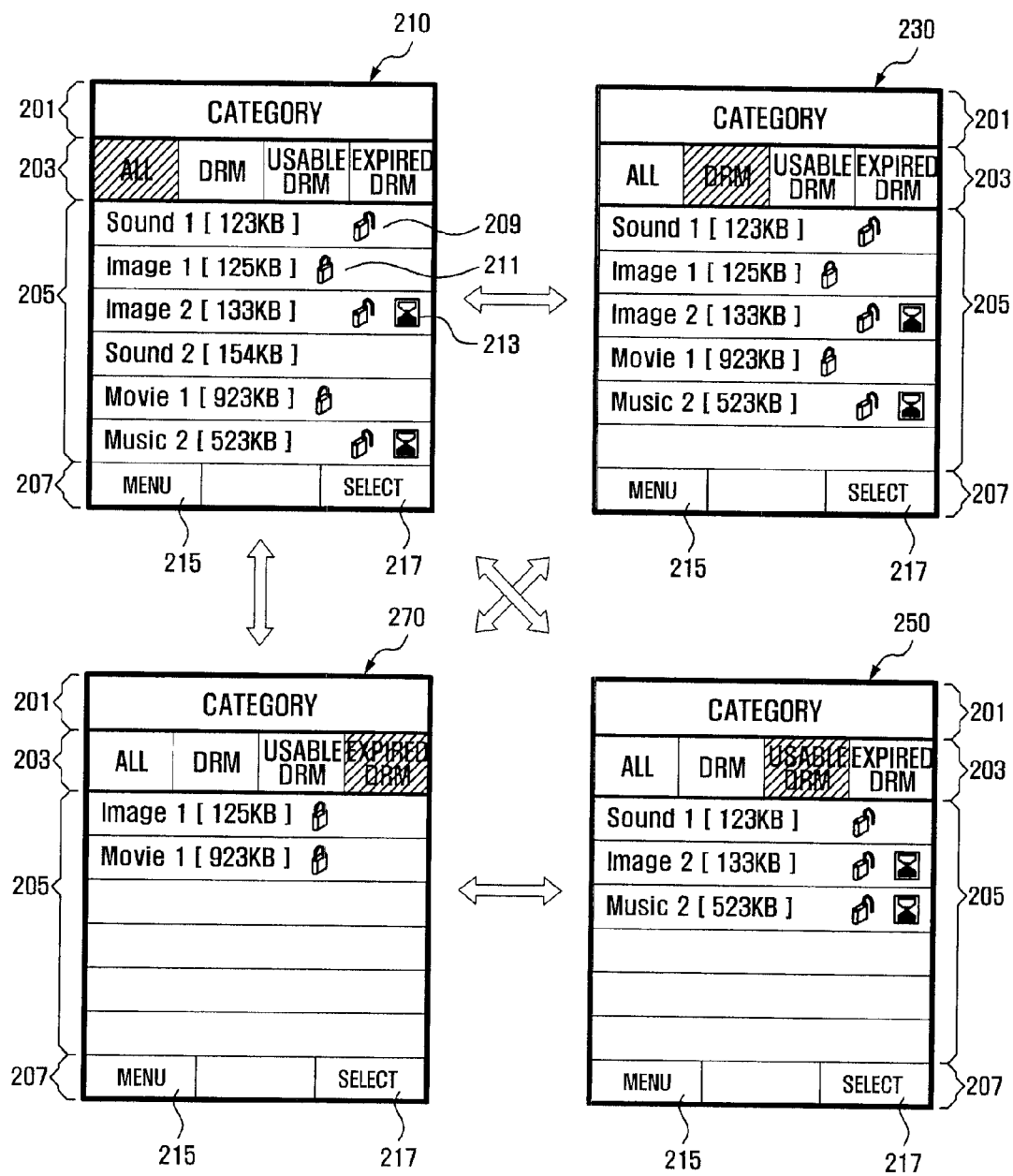
FIG. 2 provides a number of screenshots that illustrate an example of a user interface for a mobile device which provides a content list in which contents are classified by their type in accordance with an exemplary embodiment of the present invention.
Figure 3:
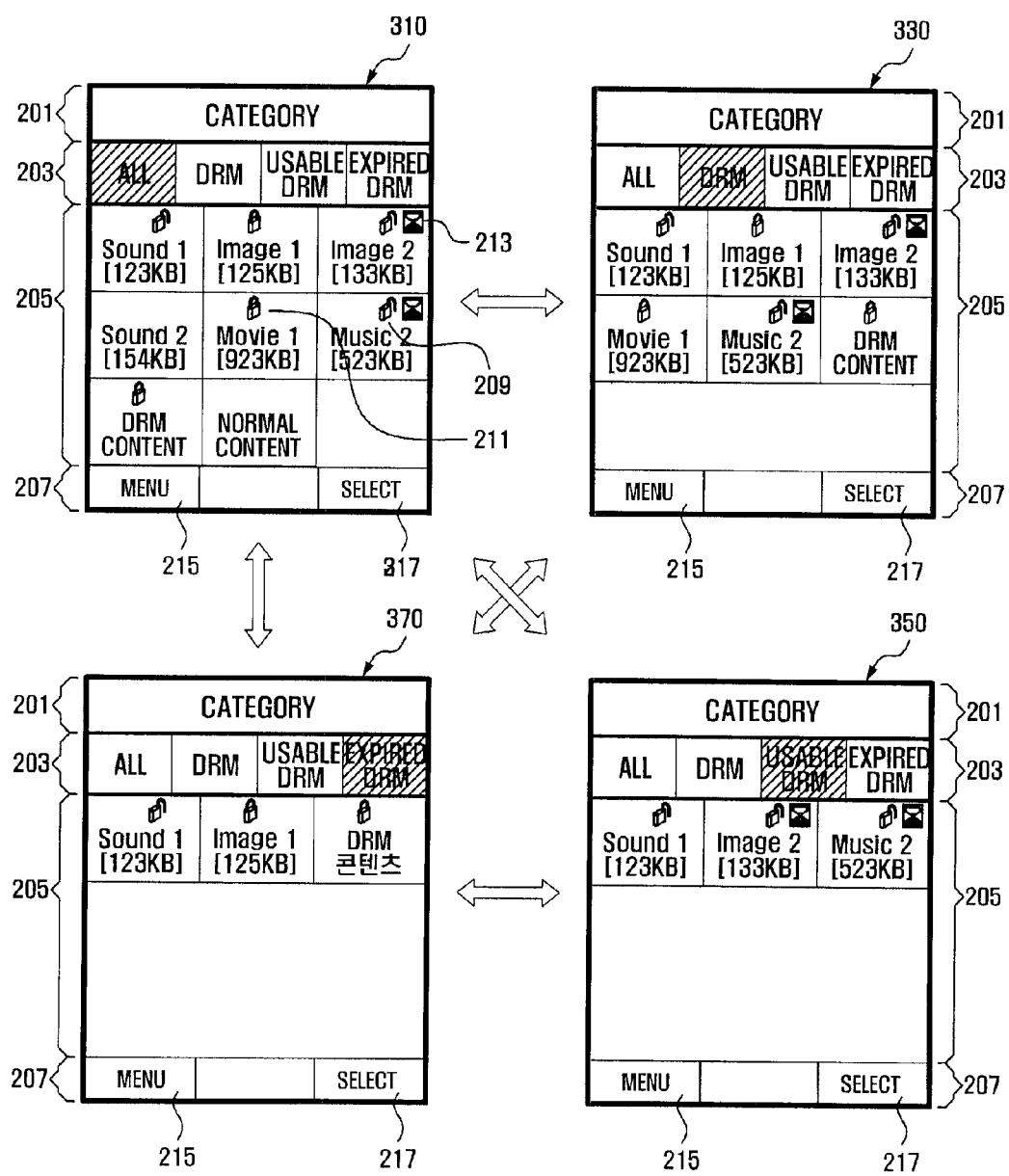
FIG. 3 is a number of screenshots of a view that illustrates another example of a user interface for a mobile device which provides a content list in which contents are classified by their type in accordance with another exemplary embodiment of the present invention.

FIGS. 2 and 3 illustrate a user interface, for a mobile device according to an exemplary embodiment of the present invention, which allows for distinguishing DRM contents from normal contents, searching DRM contents separately from non-DRM contents, and managing license-expired non-usable DRM contents separately from usable DRM contents. The following exemplary embodiment is provided for illustrative purposes only and is not to be considered as a limitation of the present invention. It will be understood by those skilled in the art that this invention may be embodied in many different forms besides those shown and described herein.

FIG. 2 shows some screenshots that illustrate an example of a user interface for a mobile device which provides a content list in which contents are classified by their type in accordance with an exemplary embodiment of the present invention.

Referring now to FIG. 2, in response to a user's request, the mobile device can offer a user interface as indicated by a reference number 210. This user interface 210 displays an example of a content list which identifies all the contents stored in the mobile device. Alternatively, such a user interface of the present invention may provide individual content lists of less than all the contents in the mobile device, sorted by a category such as music, movie, album, etc.

As shown in FIG. 2, the contents in the present invention may be classified into normal (non-DRM) contents and DRM contents. Furthermore, DRM contents may be further classified into usable DRM contents which can be used, and non-usable DRM contents which cannot be used due to the expiration of a license. Also, some DRM contents nearing their license expiration may be distinguished from usable DRM contents. A more detailed description is as follows.

As indicated by reference numbers 210, 230, 250 and 270, a user interface in exemplary embodiments of the present invention may include a category section 201, a sorting section 203, a list display section 205, and a sub-section 207. The category section 201 represents a category to which the current content list belongs, and the sorting section 203 represents sorting types of contents. The list display section 205 represents arrangement of contents contained in a selected sorting section. The sub-section 207 includes a menu soft key 215 having several options for individual contents, and a selection soft key 217 for selecting at least one of the contents listing.

In an exemplary embodiment of the present invention, the list display section 205 may contain several graphical icons 209, 211 and 213. These icons 209, 211 and 213 represent information about current states of DRM contents. Certain content without such an icon may be a normal content. That is, an exemplary embodiment of the present invention may assign predefined graphical icons to DRM contents in order to distinguish DRM contents from normal contents.

These icons may show the current states of individual DRM contents. Specifically, the first type of icon 209 indicates a usable DRM content with non-expired license, whereas the second type of icon 211 indicates a non-usable DRM content with an expired license.

Additionally, the third type of icon 213 indicates content having the approach of the license expiration when certain usable DRM content has a usable count lower than a predetermined value. In another exemplary embodiment, the third type icon 213 may be applied to all of the DRM contents in order to tell the current states of individual contents. For example, a dynamic icon like a sandglass may be used individually for respective usable DRM contents, thus dynamically informing of a change of their usable count.

The user interface 210 provides a content list of all contents in response to a user's request, including both normal (non-DRM) contents and DRM contents. That is, the user interface 210 shows a case in which a sorting type <All> is selected in the sorting section 203. This sorting type <All> allows arranging all contents in the current category regardless of normal (non-DRM) contents and DRM contents.

When a user selects another sorting type in the sorting section 203, the mobile device classifies the contents based on the selected sorting type and then displays the classified contents in a content list.

If a sorting type <DRM> is selected in the sorting section 203, the mobile device sorts out DRM contents from all contents and displays the DRM contents only as indicated by a reference number 230. That is, a sorting type <DRM> allows separating DRM contents from all contents in the current category.

While only the DRM contents are displayed in a user interface 230, the above-described icons may be still offered to show the current states of individual DRM contents. Additionally, the mobile device may use another graphical manner to distinguish non-usable DRM contents with an expired license from usable DRM contents with a non-expired license. For example, as shown in the list display section 205 of the user interface 230, non-usable DRM contents may be displayed in a dim or gray color.

If a sorting type <Usable DRM> is selected in the sorting section 203, the mobile device then sorts out usable DRM contents with a not expired license from all contents or from all DRM contents, and then displays the usable DRM contents only as indicated by a reference number 250. That is, a sorting type <Usable DRM> allows for separating usable DRM contents from all contents, or from all DRM contents in the current category. While only the usable DRM contents are displayed in a user interface 250, the above-described icons may be still offered to show the current states of individual usable DRM contents.

If a sorting type <Expired DRM> is selected in the sorting section 203, the mobile device sorts out the non-usable DRM contents with an expired license(s) from all contents, or from all DRM contents, and then displays the non-usable DRM contents only as indicated by a reference number 270. That is, a sorting type <Expired DRM> allows separating license-expired, non-usable DRM contents from all contents or all DRM contents in the current category. While the non-usable DRM contents only are displayed in a user interface 270, the above-described icons may be still offered to show the current states of individually expired DRM contents.

As discussed heretofore, the present invention may allow a content list to be intuitively displayed in various forms according to a user's menu selection, thus allowing a user to discern more easily the various types of individual contents arranged in the content list.

Although not illustrated in FIG. 2, the sorting section 203 may further include a sorting type <Normal>. When this sorting type <Normal> is selected, the mobile device sorts out normal (non-DRM) contents from all of the contents and then displays only the non-DRM contents. That is, a sorting type <Normal> allows for separating normal (non-DRM) contents from all the contents in the current category. While normal contents only are displayed in a user interface, the above-described icons for DRM contents may be not offered for display.

Furthermore, although not illustrated in FIG. 2, a user may also select at least one of contents in a content list and then remove the selected content. Particularly, a user may remove parts, or all, of the DRM contents having expired licenses.

Sorting types in the sorting section 203 may have a variety of configurations, which may be changed to accommodate a user's need or convenience.

A user interface shown in FIG. 2 provides just rough and basic information about individual contents through a content list. However, in another exemplary embodiment, more detailed information about individual contents may be offered in response to a user's request. That is, when a user selects a specific content and requests detailed information, a screen of a user interface is changed to display detailed information about the selected content. Detailed information about contents may include, for example, category information, license information (e.g., usable count, usable time, etc.), purchasing server information (e.g., web site URL information, etc.), and license purchasing price information, just to name a few possible attributes.

Information about a purchasing server may be contained, for example, in header information of DRM content. It is therefore possible to select a DRM server necessary for acquiring a license for access of DRM content by referring to DRM server URL information contained in the header of DRM content. That is, DRM content in the present invention may include, for example, a field representing URL information about at least one DRM server.

FIG. 3 is a screen view that illustrates another example of a user interface for a mobile device which provides a content list in which contents are classified by their type in accordance with another exemplary embodiment of the present invention. More particularly, FIG. 3 shows another type of a content list in which contents are arranged in a grid pattern.

The configuration and operation of elements shown in FIG. 3 correspond to those of elements previously described with reference to FIG. 2, except that a content list displayed in a list display section 205 of FIG. 3 has a grid pattern.

Specifically, the configuration and operation of a user interface 310 in FIG. 3 substantially correspond to those of the above-discussed user interface 210 in FIG. 2. Similarly, the configuration and operation of user interfaces 330, 350 and 370 in FIG. 3 respectively correspond to those of the above-discussed user interfaces 230, 250 and 270 in FIG. 2. Accordingly, a detailed description regarding FIG. 3 will be omitted herein.

A user interface illustrated in the above-discussed exemplary embodiments allows classification of contents by their type in the mobile device. A user interface to be described hereinafter allows for repurchasing a license for non-usable DRM contents due to an expired license. The following exemplary embodiment is, however, exemplary only and not to be considered as a limitation of the present invention. It will be understood by those skilled in the art that this invention may be embodied in many different forms.

Figure 4:
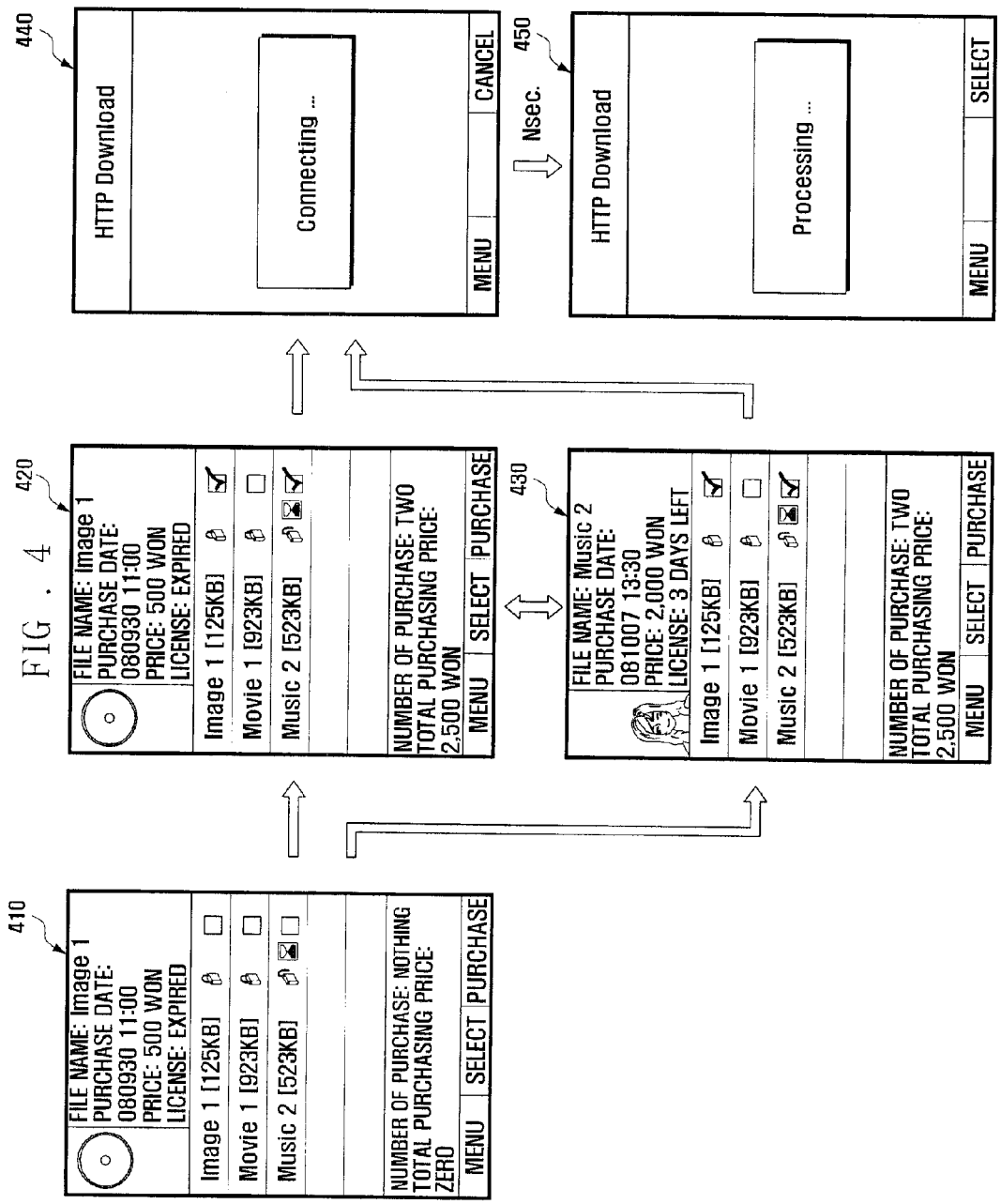
FIG. 4 is a number of screenshots of a view that illustrates an example of a user interface for a mobile device which allows the repurchase of a license in accordance with an exemplary embodiment of the present invention.

FIG. 4 is a screen view that illustrates an example of a user interface for a mobile device which allows for the repurchase of a license in accordance with an exemplary embodiment of the present invention. However, prior to referring to FIG. 4, it is noted that the mobile device may request the license repurchase of a selected DRM content in the user interface 210, 230, 250 or 270 shown in FIG. 2 or 310, 330, 350 or 370 shown in FIG. 3. Such a license repurchase often may be made for a plurality of DRM contents in a bundle. Hereinafter, let's suppose candidate contents for the license purchase are license-expired DRM contents (Image 1, Movie 1) and expiry-approaching DRM contents (Music 2) shown in FIG. 2.

Referring now to FIGS. 2 and 4, when the license repurchase is requested for DRM contents (Image 1, Movie 1, and Music 2), the mobile device may provide a user interface as indicated by a reference number 410 in FIG. 4. That is, the mobile device provides candidate contents (Image 1, Movie 1, and Music 2) for the license purchase through a user interface 410. Herein, the initial screen of a user interface displays a focus or a highlight at the uppermost DRM content (Image 1) among the requested DRM contents. Additionally, rough information (file name, purchase date, price, license, etc.) about the focused DRM content may also be displayed.

In order to purchase a license for DRM content, a user may select all or parts of DRM contents displayed in a user interface. Reference numbers 420 and 430 indicate such examples.

A user interface 420 or 430 is cases in which parts (Image 1, Music 2) of all displayed DRM contents are selected. Specifically, the user interface 420 has a focus located at the first DRM content (Image 1) by a user's selection, whereas the user interface 430 has a focus located at the third DRM content (Music 2) by a user's selection. Additionally, the first DRM content (Image 1) focused in the user interface 420 is a license-expired DRM content, and the third DRM content (Music 2) focused in the user interface 430 is an expiry-approaching DRM content (as indicated by he hourglass in this particular example).

As discussed above, when desiring the purchase of a license, a user can select at least one of the DRM contents through a user interface of the present invention. Thereafter, a user may request the purchase of the selected DRM content.

Then, in response to a user's request for purchase, the mobile device, for example, can try to connect with the DRM server as indicated by a reference number 440. That is, a user interface 440 is an example of a screen showing the connection with the DRM server in response to a request of the license purchase.

The connection with the DRM server includes selecting the DRM server for acquiring a license of DRM content with reference to URL information of the DRM server contained in the header information of the DRM content.

After being connected with the DRM server, the mobile device performs a web browsing by using URL of the selected DRM server, and also performs a download of licenses for DRM contents requested by a user in a user interface 420 or 430. A user interface 450 is an example of a screen showing the download of licenses.

After completing the download of licenses, the mobile device applies the purchased licenses to the respective contents to update their licenses.

The above exemplary description discloses an intuitive process of content management through a user interface. Described hereinafter is an internal process of content management by a mobile device. The following description is, however, exemplary only and not to be considered as a limitation of the present invention. It will be understood by those skilled in the art that the claimed invention may be embodied in many different forms than the examples shown and described herein.

Figure 5:
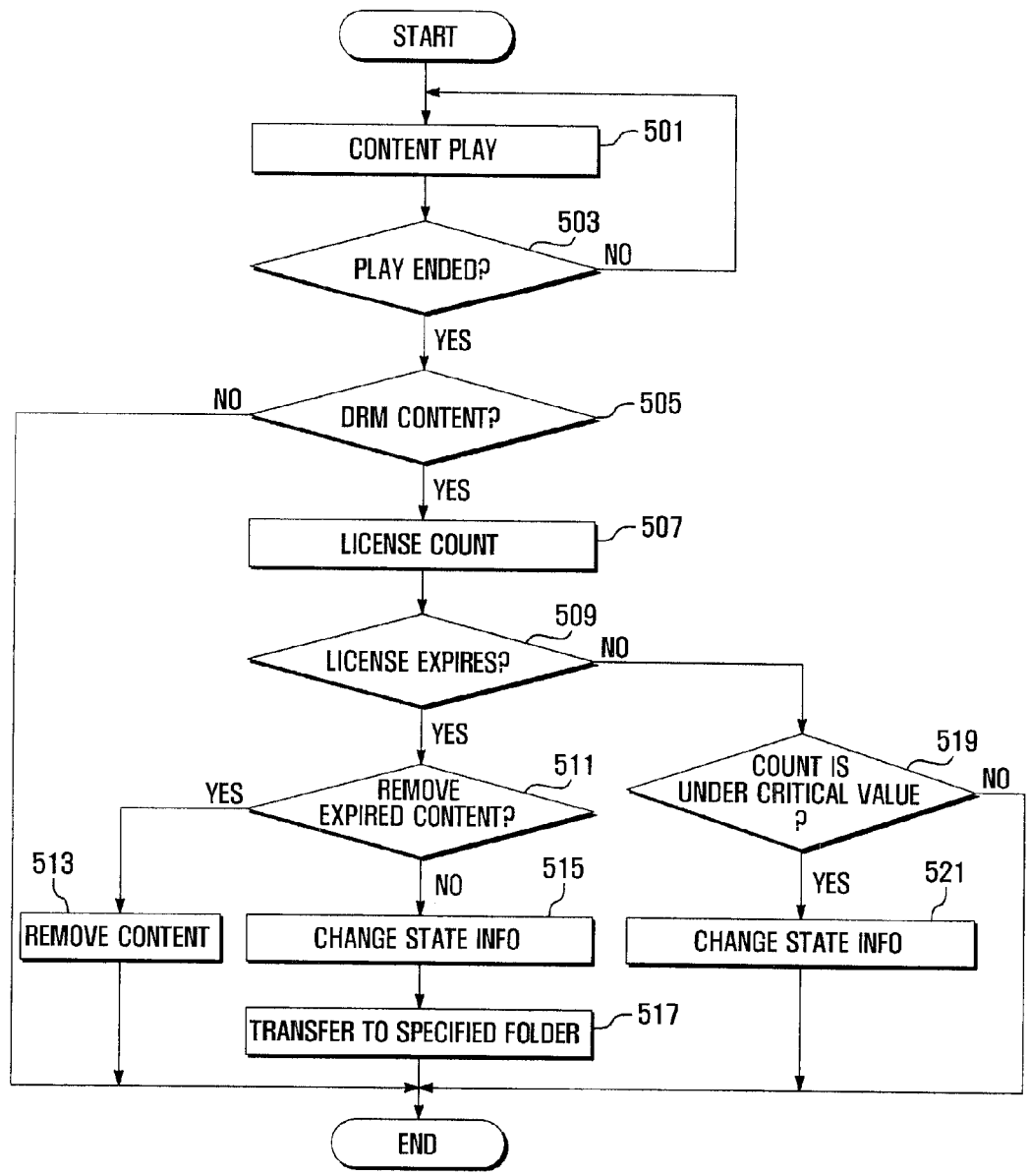
FIG. 5 is a flow diagram that illustrates a process of managing contents in a mobile device in accordance with an exemplary embodiment of the present invention.

FIG. 5 is a flow diagram that illustrates exemplary operation of a process of managing contents in a mobile device in accordance with an exemplary embodiment of the present invention.

Referring now to FIG. 5, the mobile device performs the play of a specific content in response to a user's request (step 501). Then the mobile device determines whether the play of the specific content has ended (step 503).

When the play of the content has ended, the mobile device further determines whether the play-ended content is a DRM content or a normal content (step 505). That is, the mobile device analyzes the type of the play-ended content. For this analysis, DRM contents may have particular identification information field which represents DRM-applied contents. Depending on the existence or not of such identification information, the mobile device can therefore distinguish DRM contents from normal contents.

On the other hand, DRM contents to be played need a decoding key typically contained in a license. So, by checking whether the play of content is contingent on having a license, the mobile device can alternatively distinguish DRM contents from normal contents. Additionally, other techniques may be used for distinguishing DRM contents from normal contents.

If it is determined that the play-ended content is one of DRM contents, the mobile device counts a license of the DRM content (step 507). For example, if the DRM content has had a license count available for ten times before a current play, the mobile device counts a license after the end of a current play and then reduces it by one. Therefore, a license of the DRM content is available for just nine times in play as the count has been reduced by one.

Then the mobile device determines whether a license has expired (step 509). If a license expires, the mobile device further determines the procedure of processing the license-expired DRM content (step 511). Here, a user may establish in advance such a procedure, for example, to automatically remove the license-expired DRM content or to transfer it to a specified folder. In this case, the mobile device determines whether or not to remove the license-expired DRM content. Here, the removing the license-expired DRM content comprises erasing the content from the mobile device.

Still referring to FIG. 5, when step (511) is affirmative, the mobile device removes the license-expired DRM content (step 513). In the case where step (511) is negative (i.e., in case of transferring the content), the mobile device changes information about the current status of the DRM content (step 515). For example, as previously described with reference to FIGS. 2 and 3, an icon 211 indicating the expiration of a license is assigned to the license-expired DRM content. It should be understood and appreciated by the artisan that expired content can be indicated in ways other than by providing an icon. For example, the description of the content could change color, change size, flash on and off, beep when selected, dimmer or brighter, as just a few possible examples.

Next, the mobile device transfers the DRM content to a specified folder (step 517). For example, as previously described with reference to FIGS. 2 and 3, the license-expired DRM contents are transferred to a folder which a user specifies to manage the license-expired DRM contents only.

On the other hand, if it is determined in step 509 that a license did not expire, the mobile device further determines whether the count of a license falls under a predefined critical value (step 519). In case of yes, the mobile device changes information about the current status of the DRM content (step 521). For example, as previously described with reference to FIGS. 2 and 3, an icon 213 indicating the approach of the license expiration is assigned to the expiry-approaching DRM content.

Figure 6:
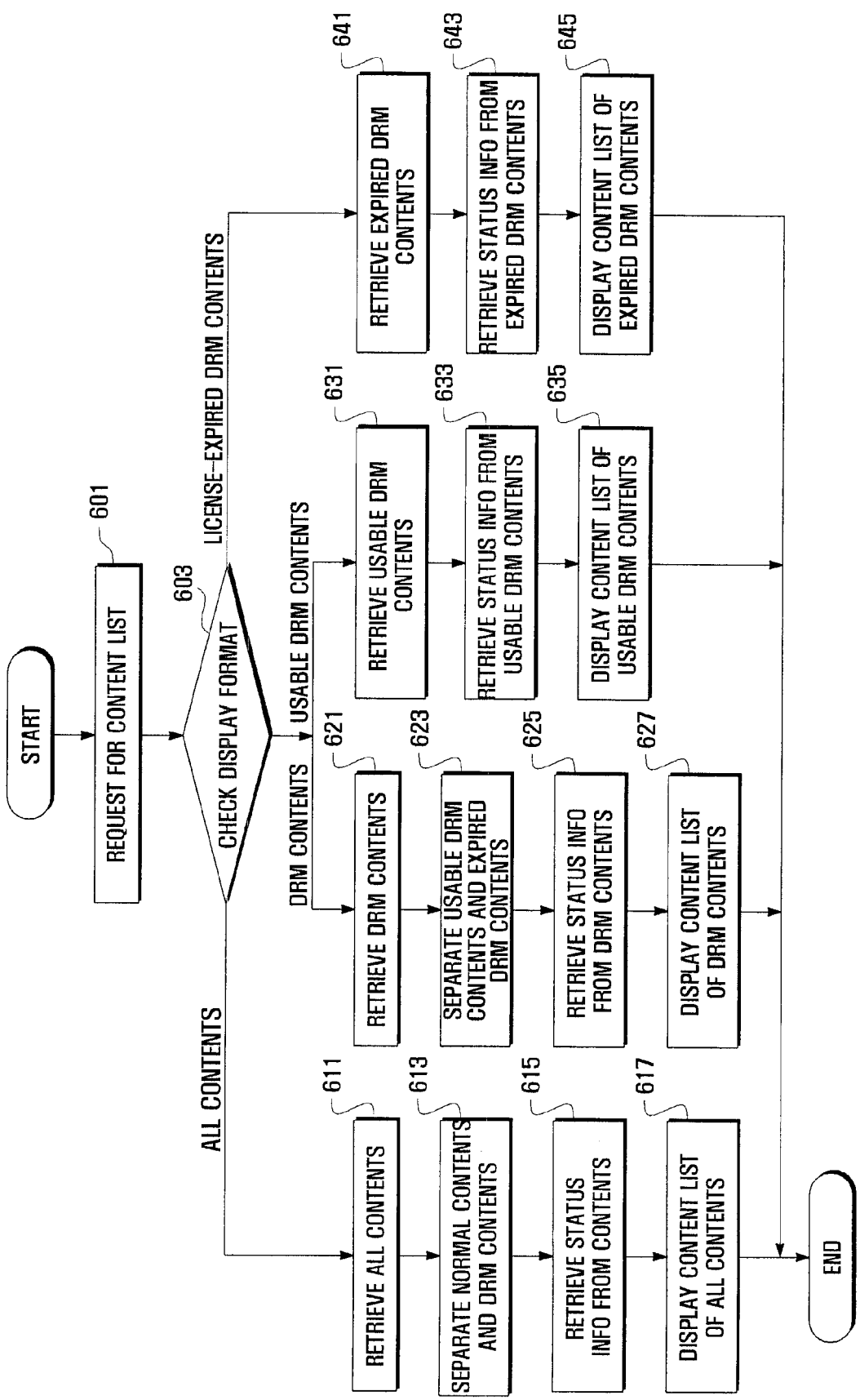
FIG. 6 is a flow diagram that illustrates an exemplary operational process of displaying contents in a mobile device in accordance with an exemplary embodiment of the present invention.

FIG. 6 is a flow diagram that illustrates exemplary operation a process of displaying contents in a mobile device in accordance with an exemplary embodiment of the present invention.

Referring now to FIG. 6, the mobile device receives a user's request for a content list (step 601). Then the mobile device displays a content list of a specified category in response to a user's request. That is, as previously described with reference to FIGS. 2 and 3, a user's requested content list is provided through a user interface.

In order to display the requested content list, the mobile device determines a display format of the requested content list first of all (step 603). Such display formats may correspond to sorting types which are discussed above with reference to FIGS. 2 and 3. Hereinafter, a process in each display format will now be described in detail.

First, in a case of all contents being displayed, the mobile device retrieves all contents contained in a specified category (step 611). Then the mobile device separates all the retrieved contents into normal contents and DRM contents (step 613). This separation of contents may depend on the existence (or non-existence) of the identification information contained in DRM contents as discussed above. Then the mobile device retrieves individual state (status) information from the respective DRM contents (step 615). As previously described with reference to FIGS. 2 and 3, such status information may be displayed in a graphical manner such as icons. Thereafter, the mobile device displays a content list which contains all the retrieved contents, namely, both normal contents and DRM contents (step 617). The mobile device also displays the retrieved individual status information near to the respective DRM contents. Examples of a content list in this case are shown with a reference number 210 in FIG. 2 and a reference number 310 in FIG. 3.

Second, in a case of DRM contents display, the mobile device retrieves DRM contents only contained in a specified category (step 621). Here, retrieved are both usable DRM contents and non-usable DRM contents regardless of the expiration of a license. Then the mobile device separates all the retrieved DRM contents into usable DRM contents and license-expired DRM contents (step 623). This separation of contents may be made by checking the license of the respective DRM contents. Then the mobile device retrieves individual status information from the respective DRM contents (step 625). As previously described with reference to FIGS. 2 and 3, such status information may be displayed in a graphical manner, such as icons. Thereafter, the mobile device displays a content list which contains all the retrieved DRM contents, namely, both usable DRM contents and license-expired DRM contents (step 627). The mobile device also displays the retrieved individual status information near to the respective DRM contents. Examples of a content list in this case are shown with a reference number 230 in FIG. 2 and a reference number 330 in FIG. 3.

Third, in a case of usable DRM contents display, the mobile device retrieves usable DRM contents only from all DRM contents contained in a specified category (step 631). Then the mobile device retrieves individual status information from the respective usable DRM contents (step 633). As previously described with reference to FIGS. 2 and 3, such state information may be displayed in a graphical manner such as icons. Thereafter, the mobile device displays a content list which contains all the retrieved usable DRM contents (step 635). The mobile device also displays the retrieved individual state information near to the respective usable DRM contents. Examples of a content list in this case are shown with a reference number 250 in FIG. 2 and a reference number 350 in FIG. 3.

Fourth, in a case of expired DRM contents display, the mobile device retrieves non-usable, license-expired DRM contents only from all DRM contents contained in a specified category (step 641). This retrieval of the license-expired DRM contents may be performed by using identification information in the respective DRM contents. Alternatively, the license-expired DRM contents may be retrieved from their separate storage region. Then the mobile device retrieves individual status information from the respective license-expired DRM contents (step 643). As previously described with reference to FIGS. 2 and 3, such status information may be displayed in a graphical manner such as icons. Thereafter, the mobile device displays a content list which contains all the retrieved license-expired DRM contents (step 645). The mobile device also displays the retrieved individual state information near to the respective license-expired DRM contents. Examples of a content list in this case are shown with a reference number 270 in FIG. 2 and a reference number 370 in FIG. 3.

Described hereinafter is a process of acquiring a license of the license-expired DRM contents discussed heretofore with reference to FIGS. 2 to 6.

Figure 7:
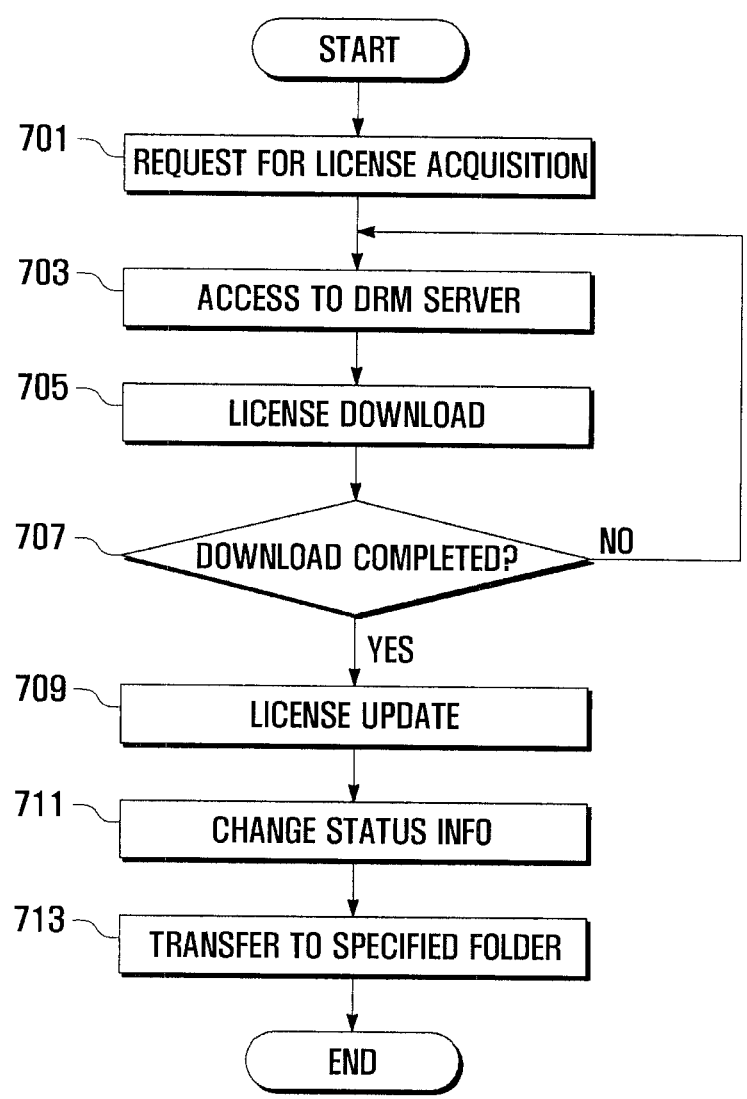
FIG. 7 is a flow diagram that illustrates an exemplary operational process of acquiring a license of expired DRM contents in a mobile device in accordance with an exemplary embodiment of the present invention.

FIG. 7 is a flow diagram that illustrates exemplary operation of a process of acquiring a license of expired DRM contents in a mobile device in accordance with an exemplary embodiment of the present invention.

Referring now to FIG. 7, the acquisition of a license for at least one of DRM contents with an expired license is requested (step 701). Then a mobile device makes an access to a DRM server from which the requested license will be acquired (step 703). Here, the mobile device selects the DRM server for acquiring a license of the license-expired DRM content with reference to URL information of the DRM server contained in the header information of the license-expired DRM content, thereby performing a web browsing process through URL of the selected DRM server.

Next, the mobile device performs a license download for at least one of license-expired DRM contents through a web browsing with the DRM server (step 705). Then the mobile device determines whether a license download has completed (step 707).

If a download is not completed, the mobile device continues to perform a download in step 705. If a download is completed, the mobile device performs a license update for each individual one of DRM contents with expired licenses by using the received license (step 709).

Next, the mobile device changes information about the current status of the license-updated DRM content (step 711). That is, according as a license of expired DRM content is updated, the status information indicating non-usable DRM content due to the license expiration is changed to the status information indicating usable DRM content.

Next, the mobile device preferably transfers the license-updated DRM content to a specified folder (step 713). For example, the license-updated DRM content can be moved from a folder containing the license-expired DRM contents to another folder, such as a folder containing usable DRM contents. This may correspond to an action of modifying metadata about storage regions of a memory unit in the mobile device.

To recap, content management methods in a mobile device and their processes according to exemplary embodiments of the present invention are discussed in detail. Described hereinafter is a mobile device which performs processes discussed above with reference to FIGS. 1 to 7. The following exemplary embodiment is, however, is provided only for explanatory purposes and not to be considered as a limitation of the claimed invention. It will be understood by those skilled in the art that the claimed invention may be embodied in many different forms than shown and described herein.

A mobile device employed for the present invention may not be limited to any specific kind of electronic device. A mobile device in the present invention may include, in some non-limiting examples, all kinds of mobile communication terminals based on protocols in various communication systems, a portable multimedia player (PMP), an MP3 player, a digital broadcasting player, a personal digital assistant (PDA), and a smart phone. Alternatively, the present invention may employ any other kinds of communication devices, portable devices, multimedia devices, and their suitable equivalents.

Figure 8:
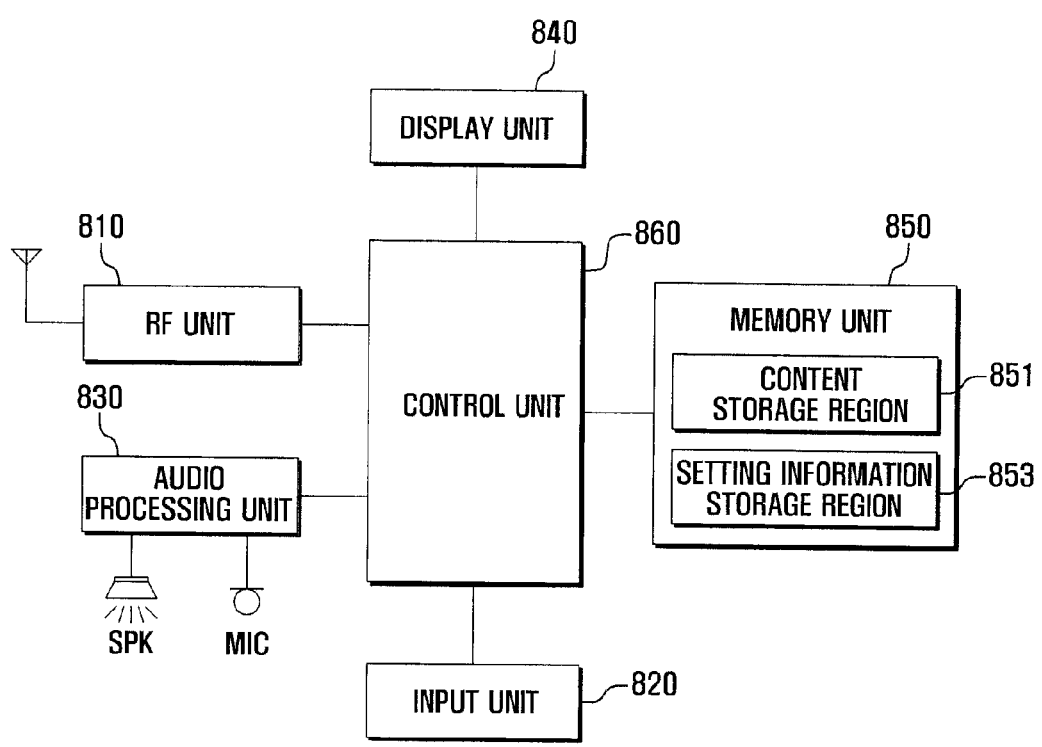
FIG. 8 is a block diagram that illustrates a exemplary configuration of a mobile device in accordance with an exemplary embodiment of the present invention.

FIG. 8 is a block diagram that illustrates a configuration of a mobile device in accordance with an exemplary embodiment of the present invention. A mobile device shown in FIG. 8 is a mobile communication device, which is, however, exemplary only and not to be considered as a limitation of the present invention.

Referring now to FIG. 8, a mobile device includes a radio frequency (RF) unit 810, an input unit 820, an audio processing unit 830, a display unit 840, a memory unit 850, and a control unit 860. The memory unit 850 may include a content storage region 851 and a setting information storage region 853.

The RF unit 810 performs communication, such as a voice communication and a data communication, through communication channels established with available mobile communication systems. The RF unit 810 may include an RF transmitter that upwardly converts the frequency of transmitted signals and amplifies the transmitted signals, and an RF receiver that amplifies received signals with low-noise and downwardly converts the frequency of the received signals.

Specifically, the RF unit 810 may send and receive messages related to the purchase of contents and the acquisition of a license for at least one of contents to and from an external server, such as a content provider server or a DRM server. Under the control of the control unit 860, the RF unit 810 may receive DRM contents and their license necessary to play the received DRM contents through a download from an external server. Also, under the control of the control unit 860, the RF unit 810 may transmit a request for acquiring a license to a DRM server, and may receive a response and a license from the DRM server.

The input unit 820 creates key input signals related to a user's setting or a function control of the mobile device, and then sends them to the control unit 860. The input unit 820 may include at least one of a keypad and a touch pad. Additionally, the input unit 820 may form a touch interface, such as a touch panel or a touch screen, separately from or together with the display unit 840.

Particularly, the input unit 820 creates key input signals for selecting at least one of contents in a content list displayed on the display unit 840, or for canceling a selection of a specific content, and then conveys them to the control unit 860. Also, the input unit 820 may send key input signal for transferring or removing the selected content to the control unit 860.

The audio processing unit 830 is preferably connected to both a microphone (MIC) and a speaker (SPK). The audio processing unit 830 receives audio signals from the microphone (MIC) and then outputs audio data to the control unit 860. Additionally, the audio processing unit 830 receives audio signals from the control unit 860 and then outputs audible sounds through the speaker (SPK). That is, the audio processing unit 830 converts analog audio signals inputted from the microphone (MIC) into digital audio signals, and also converts digital audio signals inputted from the control unit 860 into analog audio signals to be outputted through the speaker (SPK). Particularly, depending on a user's selection, the audio processing unit 830 may reproduce audio components contained in normal contents or in DRM contents.

The display unit 840 may offer graphical data, on a screen, created during the execution of functions in the mobile device. The display unit 840 also displays a content list under the control of the control unit 860. The display unit 840 visually represents several signals and color data outputted from the control unit 860.

In particular, the display unit 840 offers a user interface on a screen, and displays through the user interface a content list, which depends on a display format such as normal content, DRM content, usable DRM content, expired DRM content, and all contents. This display format may depend on a user's setting or selection, and the display unit 840 may offer a content list in various forms according to display format under the control of the control unit 860. Also, the display unit 840 displays user interface screens for the purpose of license acquisition of DRM contents with license expiration, for web browsing, and for downloading.

A user can simply acquire a license for several DRM contents with expired licenses through a user interface. When formed of a touch screen, the display unit 840 acts as the input unit for receiving a user's input. The above-discussed FIGS. 2 to 4 correspond to this type of the display unit 840.

The memory unit 850 may be composed of ROM (read only memory) and RAM (random access memory). The memory unit 850 may store a great variety of data created and used in the mobile device. Such data includes internal data created during the execution of applications in the mobile device, and external data received from external devices such as a content provider server, a DRM server, and a personal computer. In particular, data includes normal contents, DRM contents, usable contents, license-expired non-usable contents, licenses, user interfaces offered by the mobile device, and setting information related to the use of the mobile device. Also, the memory unit 850 may store data necessary for the communication through the RF unit 810.

Particularly, the memory unit 850 can store contents in the mobile device, classifying them by their types. For example, the memory unit 850 stores contents separated into normal contents and DRM contents, which are composed of usable DRM contents and license-expired DRM contents. That is, the memory unit 850 separately stores each of individual contents according to their assigned types.

Additionally, the memory unit 850 may store metadata of individual contents. Also, when a content list is requested, the memory unit 850 may provide metadata of contents according to a display format of the requested content list. In other words, on receipt of a user's request for a content list, the control unit 860 retrieves corresponding contents from the memory unit 850 with reference to metadata according to a predetermined display format. The memory unit 850 may store contents in the content storage region 851, which may be divided by content types.

Furthermore, the memory unit 850 may store a variety of setting information related to operation of the mobile device, including setting information about processing ways for the license-expired DRM contents. This setting information may be stored in the setting information storage region 853. The memory unit 850 may store DRM contents information and licenses for the respective individual DRM contents. Such DRM contents information have size, type, title, play time, the number of play, status information (including icons), and limitations in play in connection with the respective individual DRM contents.

The memory unit 850 may also store applications required for the control of general operations of the mobile device, and applications required for the control of content management of the present invention. These applications may be needed for operations of the present invention as discussed above with reference to FIGS. 1 to 7. Such applications may be stored in an application storage region (not shown).

Additionally, the memory unit 850 may include at least one buffer which temporarily stores data produced in the execution of the above applications. The memory unit 850 may be embedded, for example, in the mobile device or may be formed in external storages such as a smart card.

The control unit 860 performs an overall control function related to the mobile device and controls the flow of signals between blocks in the mobile device. That is, the control unit 860 controls signal flows between the elements such the RF unit 810, the input unit 820, the audio processing unit 830, the display unit 840, and the memory unit 850.

Particularly, according to the present invention, to display a content list, the control unit 860 typically retrieves contents depending on a predefined or requested display format and then offers the retrieved contents to the content list. Also, when a play of certain content is ended, the control unit 860 determines the type of content. If the type is DRM, the control unit 860 counts a license of the play-ended content and then determines whether a license changed by count expires. Also, when a license expires, the control unit 860 preferably removes the license-expired content or transfers it to a specified folder. Also, depending on license information, the control unit 860 changes the status information of individual DRM contents. Additionally, the control unit 860 controls a process of acquiring a license for at least one of license-expired DRM contents.

The control unit 860 controls the display of a menu screen for a content list, the display of status information about at least one of DRM contents selected from a content list, and the display of license purchase information about the DRM contents. Also, when displaying a content list, the control unit 860 controls the contents classification such as all contents, normal contents, DRM contents, usable DRM contents, and license-expired DRM contents.

The control unit 860 may also control operations of the present invention as discussed above with reference to FIGS. 1 to 7. The control of functions by the control unit 860 may be embodied in the form of software, firmware, hardware, etc.

Furthermore, the control unit 860 may have a baseband module, which converts and modulates signals through channel coding and interleaving and then offers them to the RF module, and which processes signals received from the RF module through demodulation, equalization, channel decoding and deinterleaving. The baseband module may be included in the control unit 860 only. Alternatively, the baseband module may be included in each of the control unit 860 and the RF unit 810, or separately stored in the control unit 860 and the RF unit 810.

Although configuration of the mobile device is schematically shown in FIG. 8, this is exemplary only and not to be considered as a limitation of the present invention.

The mobile device of the present invention may further include any other elements such as a digital broadcast receiving module, a short distance communication module, a camera module and an internet communication module. Additionally, as will be understood by those skilled in the art, some of the above-discussed blocks in the mobile device according to the present invention may be omitted or replaced with another.

As discussed above, the present invention may allow a display of contents separated by their types, thus allowing a user to more simply find desired contents and to more simply discern a variety of contents through an intuitive user interface.

Additionally, the present invention may remove the license-expired DRM contents or transfer them to a specified folder, thus increasing a user's convenience in their management. Also, a user may quickly recognize the license-expired DRM contents and more effectively manage them through check, update and removal of them.

Furthermore, the present invention may allow more simplified process of acquiring a license of license-expired DRM contents, thus reducing a time required for the acquisition of a license.

While this invention has been particularly shown and described with reference to an exemplary embodiment thereof, it will be understood by those skilled in the art that various changes in form and details may be made therein without departing from the spirit and scope of the invention as defined by the appended claims.

Finally, the above-described methods according to the present invention can be realized in hardware or as software or computer code that can be stored in a machine readable recording medium such as a CD ROM, a RAM, a floppy disk, a hard disk, or a magneto-optical disk or downloaded over a network, so that the methods described herein can be rendered in such software using a special purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

What is claimed is:

1. A method for managing content in a mobile device comprising:
    responsive to a license count of a Digital Rights Management (DRM) content meeting a first threshold, modifying status information associated with the DRM content to indicate that a license for the DRM content is going to become expired; and
    responsive to the license count meeting a second threshold, removing the DRM content, wherein the removing comprises at least one of transferring the DRM content to a specified folder and erasing the DRM content from the mobile device;
    wherein removing the DRM content comprises modifying the status information associated with the DRM content to indicate that the license has expired; and
    wherein removing the DRM content comprises transferring the DRM content to the specified folder, the specified folder being configured to store a license-expired content.

2. The method of claim 1, further comprising accessing a server to perform a license update for the DRM content when the second threshold is met.

3. The method of claim 2, wherein the license is updated by increasing the license count to a predetermined value.

4. The method of claim 2, further comprising changing status information of the DRM content and then transferring the DRM content from the specified folder to another folder, wherein the specified folder is dedicated to storing license-expired content and the other folder is dedicated to storing usable DRM content, and wherein the status information associated with the DRM content is changed when the license update is completed.

5. A method for displaying a content list in a mobile device, the method comprising:
    displaying, by the mobile device, a menu screen showing a first indicator for usable Digital Rights Management (DRM) contents and a second indicator for license-expired DRM contents;
    displaying, by the mobile device, a first content list identifying both the usable DRM contents and the license-expired DRM contents; and
    responsive to a selection of one of the first indicator and the second indicator, displaying, by the mobile device, a second content list in place of the first content list, the second content list identifying one of the usable DRM contents and the license-expired DRM contents;
    wherein displaying the first content list includes retrieving status information for the usable DRM contents and the license-expired DRM contents and displaying the retrieved status information; and
    wherein the status information comprises information about a license status of any of the usable DRM contents and the license-expired DRM contents.

6. The method of claim 5, wherein displaying the first content list includes:
    retrieving both the usable DRM contents and the license-expired DRM contents from a memory of the mobile device;
    retrieving status information from the retrieved usable DRM contents and license-expired DRM contents; and
    displaying the retrieved status information as part of the first content list.

7. The method of claim 6, wherein the status information comprises information about a license status of each of the retrieved usable DRM contents and license-expired DRM contents.

8. The method of claim 5, wherein displaying the second content list includes:
    retrieving the usable DRM contents from a memory of the mobile device;
    retrieving status information from the retrieved usable DRM contents; and
    displaying the status information as part of the second content list.

9. The method of claim 8, wherein the status information comprises information about a license status of each of the usable DRM contents.

10. The method of claim 5, wherein displaying the second content list includes:
    retrieving the license-expired DRM contents from a memory of the mobile device;

retrieving status information from the retrieved license-expired DRM contents; and
displaying the retrieved status information as part of the second content list.

11. The method of claim 10, wherein the license-expired DRM contents is retrieved from a storage region of the memory that stores contents whose licenses are expired.

12. The method of claim 5, further comprising:
receiving, via one of the first content list and the second content list, a request for a license update of a license-expired first DRM content; and
establishing a connection with a licensing server to complete the requested license update.

13. The method of claim 12, wherein the connection with the licensing server is established based on URL information contained in a header of the license-expired first DRM content.

14. The method of claim 12, further comprising Changing status information associated with the first DRM content to indicate that the first DRM content is usable again.

15. The method of claim 14, further comprising transferring the first DRM content from a folder dedicated to storing license-expired DRM contents to a folder dedicated to storing usable DRM contents.

16. A mobile device comprising:
a display unit configured to display a menu screen showing a first indicator for usable Digital Rights Management (DRM) contents and an a second indicator for license-expired DRM contents;
a memory unit configured to store the usable DRM contents in a first memory region and the license-expired DRM contents in a second memory region, respectively; and
a control unit configured to:
display a first content list identifying both the usable DRM contents and the license-expired DRM contents that are stored in the memory unit; and
responsive to a selection of one of the first indicator and the second indicator, displaying a second content list in place of the first content list, the second content list identifying one of the usable DRM contents and the license-expired DRM contents.

17. The mobile device of claim 16, wherein the memory unit is further configured to store metadata associated with the usable DRM contents and the license-expired DRM contents.

18. The mobile device of claim 17, wherein the memory unit is further configured to store respective licenses for the usable DRM contents and the license-expired DRM contents.

19. The mobile device of claim 16, wherein the control unit is further configured to:
responsive to a play of a content having ended, determine whether the content is DRM content or non-DRM content;
determine a license count for the content when it is determined that the content is a DRM content; and
responsive to the license count meeting a threshold, transfer the content from the first memory region to the second memory region.

20. The mobile device of claim 16, wherein the control unit is further configured to change status information of any of the usable DRM contents depending on whether a license for that content is expired.

21. The mobile device of claim 16, wherein the control unit is further configured to receive, via one of the first content list and the second content list, a request for a license update of a license-expired first DRM content; and
establish a connection with the licensing server to complete the requested license update.

22. The mobile device of claim 21, wherein the connection with the licensing server is established based on URL information contained in a header of the license-expired first DRM content.

23. The mobile device of claim 21, wherein the control unit is further configured to change status information associated with the first DRM content to indicate that the first DRM content is usable again.

24. The mobile device of claim 16, wherein the control unit is further configured to transfer the first DRM content from the first memory location to the second memory location.

25. A method for managing content in a mobile device comprising:
determining a license count of digital rights management (DRM) content;
determining whether the license for the DRM content has expired;
determining, when the license of the DRM content has expired, a procedure of processing the license-expired DRM content;
removing, when the procedure is determined to be a removing procedure, the license-expired DRM content from the mobile device; and
changing, when the procedure is determined to be a transferring procedure, status information about a current status of the DRM content and transferring the license-expired DRM content to a specified folder
wherein transferring the license-expired DRM content comprises modifying the status information to indicate that the license has expired; and
wherein transferring the license-expired DRM content further comprises transferring the DRM content to the specified folder, the specified folder being configured to store a license-expired content.

26. A mobile device comprising:
a display unit configured to display a menu screen showing a first indicator for usable Digital Rights Management (DRM) contents and an a second indicator for license-expired DRM contents;
a memory unit configured to store the usable DRM contents in a first memory region and the license-expired DRM contents in a second memory region, respectively; and
a control unit configured for determining a license count of DRM content, for determining whether the license for the DRM content has expired, for determining a procedure of processing the license-expired DRM content when the license of the DRM content has expired, for removing the license-expired DRM content when the procedure is determined to be a removing procedure, for changing status information about a current status of the DRM content when the procedure is determined to be a transferring procedure and transferring the license-expired DRM content to a specified folder
wherein transferring the license-expired DRM content comprises modifying the status information to indicate that the license has expired; and
wherein transferring the license-expired DRM content further comprises transferring the DRM content to the specified folder, the specified folder being configured to store a license-expired content.

* * * * *

UNITED STATES PATENT AND TRADEMARK OFFICE
CERTIFICATE OF CORRECTION

PATENT NO.       : 8,732,842 B2
APPLICATION NO.  : 12/607232
DATED            : May 20, 2014
INVENTOR(S)      : Park et al.

It is certified that error appears in the above-identified patent and that said Letters Patent is hereby corrected as shown below:

In the Claims

Column 17, Claim 14, Lines 18-19 should read as follows:
--...further comprising changing status...--

Column 17, Claim 16, Line 28 should read as follows:
--...and a second indicator...--

Column 18, Claim 26, Line 43 should read as follows:
--...and a second indicator...--

Signed and Sealed this
Twenty-third Day of September, 2014

Michelle K. Lee
*Deputy Director of the United States Patent and Trademark Office*